United States Patent [19]

van den Berg et al.

[11] 3,837,033

[45] Sept. 24, 1974

[54] WINDSHIELD WIPER CONSTRUCTION

[75] Inventors: Johan H. van den Berg, Hasselt; Albert J. G. Hoebrechts, Mechelen; Alex Herman A. M. Van Eekelen, Hasselt, all of Belgium

[73] Assignee: Monroe Belgium N.V., Sint-Truiden, Belgium

[22] Filed: May 4, 1972

[21] Appl. No.: 250,340

[52] U.S. Cl. .............................. 15/250.32
[51] Int. Cl. .............................. B60s 1/40
[58] Field of Search........ 15/250.31, 250.32, 250.42

[56] References Cited
UNITED STATES PATENTS

| 3,023,446 | 3/1962 | Prohaska | 15/250.32 |
| 3,049,743 | 8/1962 | Graczyk et al. | 15/250.32 |
| 3,056,160 | 10/1962 | Oishei et al. | 15/250.32 |
| 3,082,463 | 3/1963 | Bock et al. | 15/250.32 |
| 3,405,419 | 10/1968 | Charlton et al. | 15/250.32 |
| 3,621,507 | 11/1971 | Allaria et al. | 15/250.32 |

FOREIGN PATENTS OR APPLICATIONS 228,998   7/1960   Australia.................. 15/250.32

Primary Examiner—Peter Feldman
Attorney, Agent, or Firm—Harness, Dickey & Pierce

[57] ABSTRACT

A windshield wiper assembly including a wiper arm, a flexible wiping blade and a blade superstructure for operatively supporting the blade, and a connecting element adapted to detachably secure the subassembly consisting of the blade and the blade superstructure upon one end of the wiper arm, the connecting element comprising first and second integral attachment sections operatively connected to the arm and the superstructure and being of a molded, one-piece construction fabricated of a corrosion resistant polymeric material.

9 Claims, 6 Drawing Figures

PATENTED SEP 24 1974 3,837,033
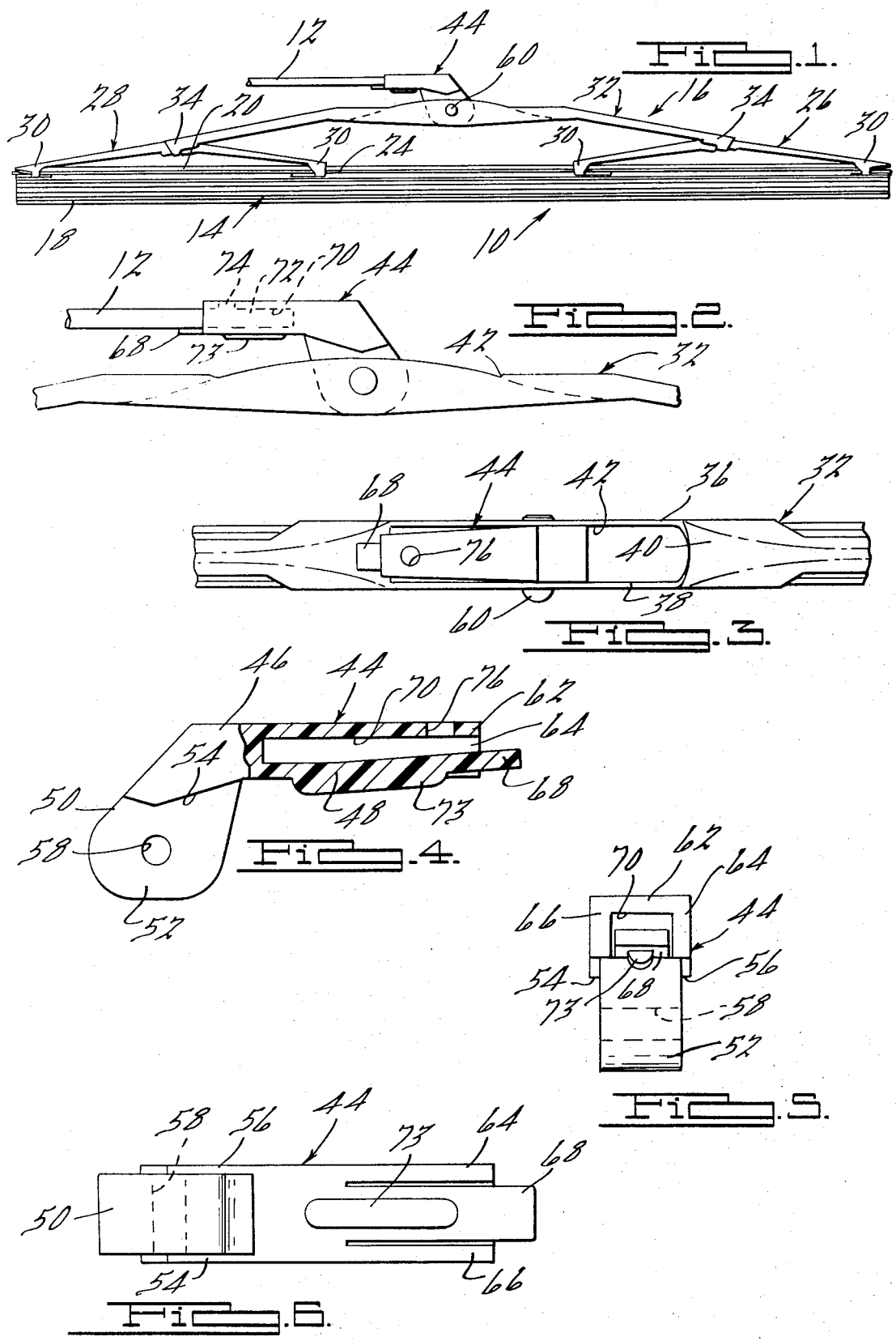

WINDSHIELD WIPER CONSTRUCTION

SUMMARY OF THE INVENTION

The present invention is directed toward a new and improved connecting element for operatively securing a windshield wiper arm to an associated subassembly consisting of a wiper blade and associated support superstructure. The connecting element of the present invention will be found to have a number of features not shown in the prior art due to the fact that said element is of a one-piece molded plastic construction, preferably fabricated of nylon. As a result of this construction, only a single component part is required instead of a large number of separate components as has been necessary in heretofore known and used similar types of connectors. In addition, by virtue of the fact that the connecting element is fabricated of a polymeric or plastic material, there is no metal to metal contact and thus the connecting element of the present invention exhibits superior noise reducing characteristics. Also, no non-metallic spacer elements are necessary to avoid noise, as has been necessary in prior art connecting elements. Furthermore, by fabricating the connecting element of the present invention of a corrosion-resistant material, no special coating, i.e. painting or the like, is required in order to avoid corrosion of the different metallic parts having different positions on the electromotive scale, as has been necessary in the prior art. Of course, no coloring operations are necessary since pigmentation can be incorporated in the material from which the connecting element is fabricated.

Accordingly, it is a general object of the present invention to provide a new and improved connecting element for operatively connecting windshield wiper blades and associated superstructure to a wiper arm.

It is a more particular object of the present invention to provide a new and improved connecting element of the above character which is of a one-piece molded plastic construction and is thereby adapted to minimize inventory and related manufacturing expenses to the extreme.

It is another object of the present invention to provide a new and improved windshield wiper connecting element, as above described, which exhibits superior corrosion resistance and noise reducing characteristics.

It is a further object of the present invention to provide a new and improved windshield connecting element that is of a simple design, and which will have a long and effective operational life.

Other objects and advantages of the present invention will become apparent from the following detailed description taken in conjunction with the accompanying drawing:

BRIEF DESCRIPTION OF THE DRAWING

FIG. 1 is a side elevational view of the connecting element of the present invention, as shown in operative association of a conventional windshield wiper blade, superstructure and wiper arm;

FIG. 2 is an enlarged side elevational view of the connecting element shown in FIG. 1;

FIG. 3 is an enlarged top elevational view of the connecting element shown in FIG. 2;

FIG. 4 is an enlarged side elevational view of the connecting element of the present invention;

FIG. 5 is an end elevational view of the right end of the connecting element illustrated in FIG. 4, and FIG. 6 is a bottom elevational view of the connecting element illustrated in FIG. 4.

DESCRIPTION OF THE PREFERRED EMBODIMENT

Referring now in detail to the drawing and in particular to FIGS. 1 through 3 thereof, a windshield wiper blade assembly 10 is shown in general operative association with a wiper arm 12 which is intended to function in reciprocating the wiper blade assembly 10 across a surface, such as a vehicle windshield (not shown) to be cleaned. The assembly 10 generally comprises a wiper element 14 that is preferably constructed of some desirable resilient material, such as rubber or the like, and which is adapted to be supported by a wiper blade superstructure 16 upon the outer extremity of the arm 12. The wiper element 14 typically comprises a wiping lip portion 18 and a coextensive head portion 20 which are adapted to be supported by a longitudinally extending backing strip or flexor element 24.

The superstructure 16 is shown as comprising a pair of elongated yokes or links 26 and 28 that are substantially identical in construction and operation and which comprise generally U-shaped or claw-like end sections 30 adapted for clamping engagement with the aforementioned flexor element 24 in a manner well known in the art. Extending between and operatively connecting the yokes 26 and 28 is an elongated bridge member 32 having opposite end portions 34 connected to the upper extremities of the yokes 26 and 28. As best shown in FIG. 3, the bridge member 32 is of a generally channel-shaped configuration and comprises opposed side portions 36 and 38 and an interconnecting top or web portion 40. The top portion 40 of the bridge member 32 is formed with a central opening 42 which is adapted to operatively receive a connecting element 44 that is constructed in accordance with the principles of the present invention and is operable to support the subassembly consisting of the superstructure 16 and assembly 10 on the outer or terminal end of the arm 12, as will hereinafter be described in detail.

As best shown in FIGS. 4 through 6, the connecting element 44 of the present invention is of a molded one-piece construction and comprises a body 46 which is made up of an arm attachment section 48 and a blade attachment section 50. The blade attachment section 50 is formed with a reduced thickness portion 52 which defines a pair of laterally extending shoulders 54 and 56. The lateral width of the portion 52 is designed to correspond with the interior spacing between the side portions 36 and 38 of the bridge member 32, whereby the connecting element 44 is adapted to be nestingly received therebetween, as shown in FIGS. 1 through 3. The section 50 is formed with a laterally extending opening 58 which is adapted for registry with a pair of aligned openings in the side portion 36, 38 of the bridge member 32, which openings are adapted to receive a suitable pivot pin, rivet or the like 60 for pivotably connecting the connecting element 44 to the superstructure 16, and in particular, the bridge member 32 thereof. As illustrated, when the connecting element 44 is thus connected to the bridge member 32, the blade assembly 10 is pivotable about an axis extending at generally right angles to the arm 12, as will be appreciated by those skilled in the art.

With reference now to the arm attachment section 48 of the connecting element 44, said section 48, as previously mentioned, is formed integrally of the attachment section 50 and comprises a longitudinally extending top portion 62 and a pair of downwardly extending laterally spaced side portions 64 and 66, as best seen in FIG. 5. Extending longitudinally outwardly from the body 46 at the position interjacent the side portions 64, 66 is a resilient spring finger section 68 which defines with the portions 62 through 66, a generally rectangular shaped, longitudinally extending recess 70 that is adapted to nestingly receive the terminal end 72 of the wiper arm 12 in a manner best shown in FIG. 4. The spring finger section 68 is formed with a reinforcing rib or the like 73 on the lower side thereof and is adapted to deform or pivot about an axis extending generally perpendicular to the recess 70, whereby to resiliently bias the terminal end 72 of the arm 12 upwardly toward the underside of the top portion 62. In this configuration, a generally cylindrically shaped lug 74, that is conventionally provided on the terminal ends of windshield wiper arms, is biased upwardly into nesting engagement with an annular opening 76 formed within the top portion 62, whereby to fixedly secure the connecting element 44 against relative longitudinal displacement with respect to the arm 12.

While the connecting element 44 of the present invention may be fabricated of a wide variety of different types of materials, the element 44 is preferably fabricated of a corrosion resistant plastic material which is of a high structural integrity. One material that has been found to be highly satisfactory is Nylon 6 which consists of a Nylon obtained by polycondensation of caprolactam. This particular material has the following general physical characteristics: a tensile strength of between 73,000 and 120,000 lb./sq. inch; elongation 16 to 42 percent; specific gravity 1.14; and a moisture absorbency of 8 percent at 95 percent relative humidity. It will be appreciated, of course, that various other materials having similar physical characteristics may be used in fabrication of a connecting element 44 without departing from the scope of the present invention. In accordance with a preferred construction of the present invention, the material from which the connecting element 44 is fabricated is reinforced with a glass fibrous material or an equivalent strengthening substance. While such strengthening material is not absolutely necessary to achieve proper operation of the element 44, the provision of such ancillary material has been found highly desirable in enhancing the structural integrity thereof. Preferably a composition of approximately 70 percent Nylon to approximately 30 percent glass fiber has been found to be highly satisfactory.

One particularly important feature of the present invention resides in the fact that the connecting element 44 is of a one-piece, molded construction, and thus overcomes a number of particularly objectionable manufacturing characteristics of similar type elements heretofore known and used in the prior art which consisted of multicomponents that were fabricated, for example, of various metallic materials. The construction of this invention readily lends itself to injection molding techniques, thus obviating the need for any complicated stamping and assembly operations which have been required with metal connectors. Another feature of the present invention results in the fact that there is no metal-to-metal contact between various components thereof, thus enhancing the noise characteristics of the connecting element 44. In addition, no plastic or similar non-metallic spacer elements are required for separating metal components, as has heretofore been required. Additionally, by fabricating the connecting element 44 of a one-piece molded plastic construction, the corrosion resistance characteristics of the element are inordinately superior to conventional metal connecting elements, with such superior corrosion resistance existing without the need for any painting or other coating operations. Of course, when it is desired to color the connecting element of the present invention, the coloring pigment may be placed directly within the material from which the connecting element 44 is fabricated so as to provide certain aesthetic advantages over conventional metal connectors. Still a further advantage of the present invention over prior known connecting elements results in the minimizing of the light reflection characteristics which may be achieved with molded plastics, as compared with the highly reflective character of conventional metal connectors, whereby to assure against possible distracting glare under certain light conditions.

It will be noted that the spring finger section 68 slopes upwardly toward the outer end of the recess 70 so that at such time as the terminal end 72 of the associated wiper arm 12 is inserted into the recess 70, the finger section 68 is biased slightly downwardly relative to the top portion 62, with such biasing of the spring finger section 68 causing the same to be stressed, which in turn results in the section 68 exerting a continuously upwardly directed force against the underside of the end 72 of the arm 12 to insure positive engagement of the lug 74 within the opening 76. It will be appreciated, of course, that at such time as it is desired to detach the assembly 10 from the arm 12, it is merely necessary to bias the finger section 68 slightly downwardly to permit the end 72 to be moved away from the top portion 62 and thus effect withdrawal of the lug 74 from the opening 76, at which time the entire assembly 10 may be longitudinally displaced away from the end of the wiper arm 12 for purposes of replacement, inspection, etc.

While it will be apparent that the preferred embodiment illustrated herein is well calculated to fulfill the objects above stated, it will be appreciated that the present invention is susceptible to modification, variation and change without departing from the scope of the invention.

What is claimed is:

1. A monolithically formed connecting element for detachably securing a subassembly consisting of a windshield wiper blade and a blade supporting superstructure to an outer end of a movable wiper arm, said superstructure including a generally channel shaped member having opposed side sections and a top section defining an opening and said outer end of said arm being of generally rectangular shaped cross section and having a locking portion on the upper side thereof, said element comprising an elongated body fabricated from a corrosion resistant polymeric material and having a first section at one end thereof operatively mounted within said opening in said channel shaped member and a second section at the opposite end thereof adapted to be secured to said end of said associated wiper arm, said first section of said element being substantially the same lateral width as the distance between said side section of said channel shaped member, means extending laterally through said side section of said channel shaped member and through an opening formed laterally in said first section for pivotably supporting said first section, said second section of said element body defining an elongated generally rectangularly shaped blind aperture having parallel vertically extending side walls spaced laterally apart a distance at least as great as the lateral width of said end portion, and upper and lower walls extending laterally between said side walls, said upper wall having means thereon defining a locking portion adapted to cooperate with the locking portion on the wiper arm, means for applying a compressive bias against the lower side of said wiper arm, said means including a portion removed from said lower wall which defines a flexible cantilevered finger, said finger extending toward the open end of said aperture and projecting partially upwardly thereinto, said finger being deflected downwardly away from said upper wall when said end portion of the wiper arm is inserted into said aperture and is adapted to resiliently urge said outer end of said wiper arm upwardly to effect positive engagement of said cooperative locking portions.

2. The invention as set forth in claim 1 wherein said connecting element is fabricated of a material having a tensile strength of between 73,000 and 123,000 pounds per square inch, a specific gravity of approximately 1.14 and which is reinforced with glass fiber.

3. The invention as set forth in claim 2 wherein said connecting element is fabricated of Nylon 6.

4. The invention as set forth in claim 1 wherein said laterally extending means of said first section defines a laterally extending bore adapted to receive a pivot pin for pivotably connecting said element to said superstructure, and wherein said connecting element is fabricated of Nylon.

5. The invention as set forth in claim 1 which includes a reinforcing rib formed integrally of said element on the under side of said finger.

6. The invention as set forth in claim 1 wherein said finger is defined in part by a pair of laterally spaced slots formed in said lower wall.

7. The invention as set forth in claim 1 wherein said open end of said aperture is located at the opposite end of said element from said first section thereof.

8. The invention as set forth in claim 1 wherein said locking portions comprise interengageable male and female sections.

9. The invention as set forth in claim 8 wherein said female section is on said element and said male section is on said wiper arm.

* * * * *